United States Patent [19]

Wuertz

[11] Patent Number: 5,121,594

[45] Date of Patent: Jun. 16, 1992

[54] METHOD FOR ATTACHING A POKE-THROUGH ELECTRICAL FITTING

[75] Inventor: Emil S. Wuertz, Madison, Conn.

[73] Assignee: Hubbell Incorporated, Orange, Conn.

[21] Appl. No.: 687,216

[22] Filed: Apr. 19, 1991

Related U.S. Application Data

[63] Continuation of Ser. No. 380,484, Jul. 17, 1989, abandoned.

[51] Int. Cl.⁵ ............................................. E04G 23/00
[52] U.S. Cl. ........................................ 52/741; 52/221; 52/232
[58] Field of Search .................. 52/220, 221, 741, 745, 52/747, 232; 174/48, 58

[56] References Cited

U.S. PATENT DOCUMENTS

| | | | |
|---|---|---|---|
| 3,646,244 | 2/1972 | Cole | 174/57 |
| 3,972,579 | 8/1976 | Kohaut | 339/34 |
| 3,995,102 | 11/1976 | Kohaut | 174/48 |
| 4,091,231 | 5/1978 | Sotolongo | 174/48 |
| 4,136,707 | 1/1979 | Gaillot et al. | 137/75 |
| 4,232,493 | 11/1980 | Gray et al. | 52/221 |
| 4,243,835 | 1/1981 | Ehrenfels | 174/48 |
| 4,264,779 | 4/1981 | Rhodes et al. | 174/48 |
| 4,270,318 | 6/1981 | Carroll et al. | 52/1 |
| 4,336,416 | 6/1982 | Goodsell | 174/48 |
| 4,432,465 | 2/1984 | Wuertz | 220/235 |
| 4,458,460 | 7/1984 | Kohaut | 52/221 |
| 4,573,297 | 3/1986 | Benscoter et al. | 52/221 |
| 4,770,643 | 9/1988 | Castellani et al. | 439/135 |

Primary Examiner—Michael Safavi
Attorney, Agent, or Firm—Jerry M. Presson

[57] ABSTRACT

A fire-rated fitting includes conduit members forming passageways for wires to extend through an opening in a fire-rated floor. The fitting includes intumescent material which expands under heat to form a fire barrier. A top plate is provided on the fitting, the plate being easily detachable from and attachable to the fitting. The top plate can form a template for marking the locations of mounting holes. The fitting with the top plate attached is then firmly mounted in a non-rotatable fashion in the floor opening by using threaded fasteners through the top plate to attach it to the floor.

2 Claims, 3 Drawing Sheets

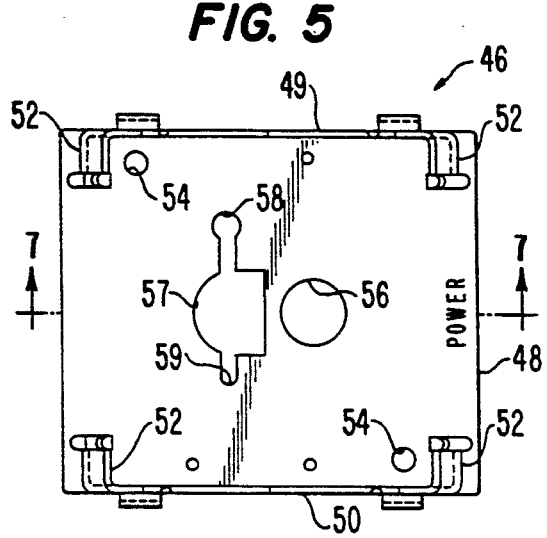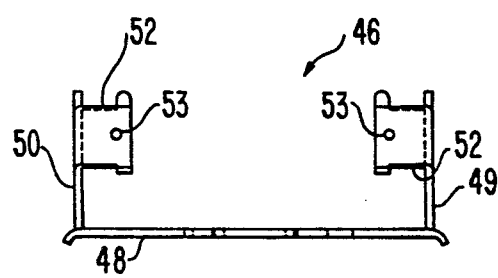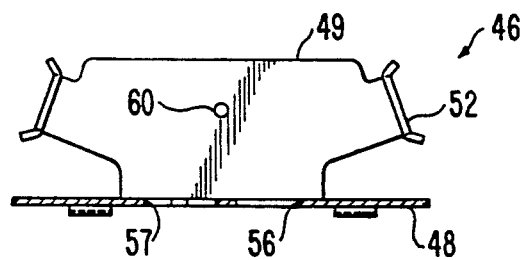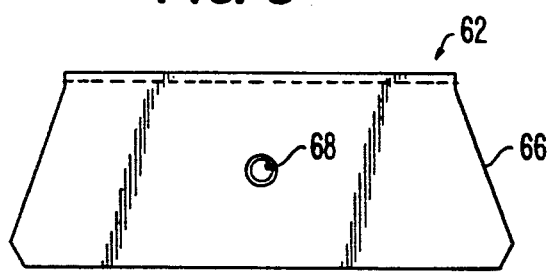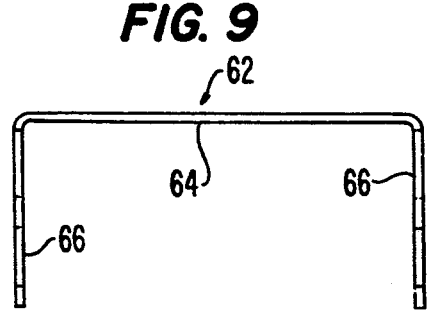

METHOD FOR ATTACHING A POKE-THROUGH ELECTRICAL FITTING

CROSS-REFERENCE TO RELATED APPLICATION

This is a division of application Ser. No. 07/380,484 filed July 17, 1989 and now abandoned.

SPECIFICATION

This invention relates to a method and apparatus for attaching a fire-rated, poke-through fitting in an opening formed in a fire-rated floor so that the fitting is non-rotatably supported in the opening.

BACKGROUND OF THE INVENTION

Certain walls and floors of buildings are fire-rated, i.e., it has been determined that they are capable of withstanding a certain amount of heat and fire for a certain interval of time without allowing the temperature of objects on the other side of the barrier to reach an undesirable or dangerous temperature. When it is necessary to pass wires through such a floor, it has become common practice to use a fire-rated fitting, commonly referred to as a poke-through fitting, which is mounted in a circular opening in the floor and which is provided with passage ways for carrying power and communication wires therethrough. An opening either is formed in the floor at the time it is needed or it is formed and then plugged with a fire-rated plug until such time as it is needed.

In order to securely hold such fittings in the floor, various devices have been developed such as expansion devices and wedging devices which act against the inwardly facing surfaces of the hole through the floor in some fashion to retain the fitting in place. However, all such devices become loose after a period of time, allowing the poke-through fitting to rotate in the hole in which it is mounted. Such rotation causes twisting and possible abrasion of the wires and is generally quite undesirable.

SUMMARY OF THE INVENTION

Accordingly, an object of the present invention is to provide a method of attaching a poke-through fitting in a opening formed in a fire-rated floor so that the fitting is non-rotatably supported therein.

A further object is to provide a fitting which is non-rotatably mountable in an opening through a fire-rated floor.

Briefly described, the invention comprises a method of attaching a fire-rated fitting in an opening through a fire-rated floor, the fitting being of the type including conduit elements forming a passageway for wires to extend through the floor opening, fire barrier means operatively associated with the conduit elements to block the wire passageway under fire and heat conditions and a top plate fixedly attachable to an upper end of the tube means and dimensioned to lie on the top surface of the floor, abutting the top surface around the floor opening, the top plate having a central portion aligned with the conduit elements. The method comprises forming a plurality of holes through the top plate at locations radially outside of the central portion, using the top plate as a template positionable in alignment with the floor opening to mark on the floor the locations of the plurality of holes in the top plate, forming holes in the floor in accordance with the holes through the top plate, attaching the top plate or a wiring device frame to the conduit elements, and attaching the top plate or the wiring device frame to the floor using threaded fasteners passing through the plurality of holes in the top plate or frame and extending into the holes formed in the floor with the central portion of the plate or frame aligned with the floor opening to thereby non-rotatably support the fitting in the floor opening.

In another aspect, the invention comprises a fire-rated fitting attachable in an opening through a fire-rated floor comprising the combination of conduit elements forming a passageway for wires to extend through the floor opening, fire barrier means operatively associated with the conduit means for blocking the interior of the wire passageway under fire and heat conditions, a top plate fixedly attachable to an upper end of the conduit elements and dimensioned to lie on the top surface of the floor around the floor opening, the top plate having a central portion aligned with the conduit elements and a plurality of holes therethrough at locations radially outside of the central portion. A wiring device frame can be selectively attached to an upper end of the conduit elements, in place of the top plate, the frame being dimensioned to lie on the top surface of the floor around the floor opening. The frame has a plurality of holes therethrough at the same locations as the holes in the top plate and also has holes through its own central portion for the passage of wires from the conduit elements. The top plate is usable, when detached from the conduit elements, to mark the locations of the plurality of holes in the top plate on the floor to thereby facilitate forming a plurality of holes in the floor alignable with the plurality of holes through either the top plate or the frame. A plurality of threaded fasteners are passed through the holes in the top plate or the frame and extend into holes formed in the floor in accordance with the marks for attaching either the top plate or the frame to the floor with the central portion of the plate aligned with the floor opening, depending on whether the fitting is to be used currently or later, thereby non-rotatably to support the fitting in the floor opening.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this specification, and wherein:

FIG. 5 is a top plan view of an electrical device frame usable with the poke-through fitting;

FIGS. 6 and 7 are end and sectional side elevations of the frame of FIG. 5, FIG. 7 being taken along line 7—7 of FIG. 5;

FIGS. 8 and 9 are side and end elevations of a device cover usable with the frame of FIGS. 5–7;

DESCRIPTION OF THE PREFERRED EMBODIMENT

Figure 1:
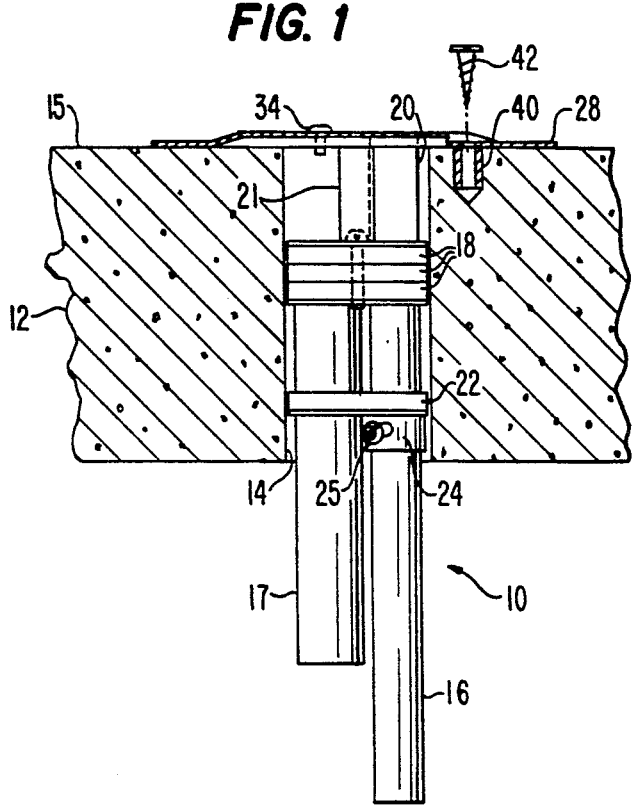
FIG. 1 is a side elevation, in partial section, of a fire-rated fitting in accordance with the present invention mounted in a floor with its top plate.

Referring to the figures, FIG. 1 shows a fire-rated poke-through fitting indicated generally at 10 mounted in a concrete floor 12 through which a generally cylindrical hole 14 has been formed.

The fitting 10 includes conduit element means comprising hollow conduit elements 16 and 17 which receive power and communication lines, respectively, from a junction box or other suitable means below floor 12 for connection to outlet means or another connector at or above the upper surface 15 of floor 12 as will be described hereinafter. The conduit elements can be tubular members or members of substantially any shape having hollow interior passageways for wires. Although the details of the fitting are not part of the present invention, it will be noted that the fitting includes a plurality of intumescent disks 18 which are positioned at the upper end of conduit elements 16 and 17, and a further tube 20 extending above the intumescent disks to continue passageways for wires to the top of the fitting. A further intumescent disk 22 is positioned at the lower end of opening 14. Normally, at least the intumescent disks 18 are arranged with openings therethrough so that the wires can penetrate from conduits 16 and 17 to the upper end of the fitting during normal operation, but so that, in the event of heat and flame either above or below floor 12, the disks will expand and close the passageways, forming a barrier which has a fire rating essentially the same as floor 12 so that the existence of opening 14 does not compromise the fire-stopping characteristics of the floor. A collar 24 and set screw 25 can be used to adjust the position of disk 22 so that it is at an appropriate location with respect to the lower surface of floor 12.

Figure 3:
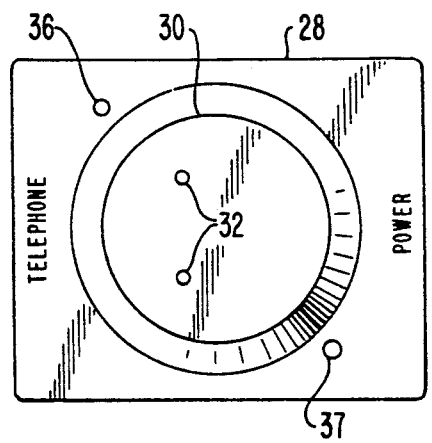
FIG. 3 is a top plan view of the top plate portion of the fitting of FIGS. 1 and 2.
Figure 2:
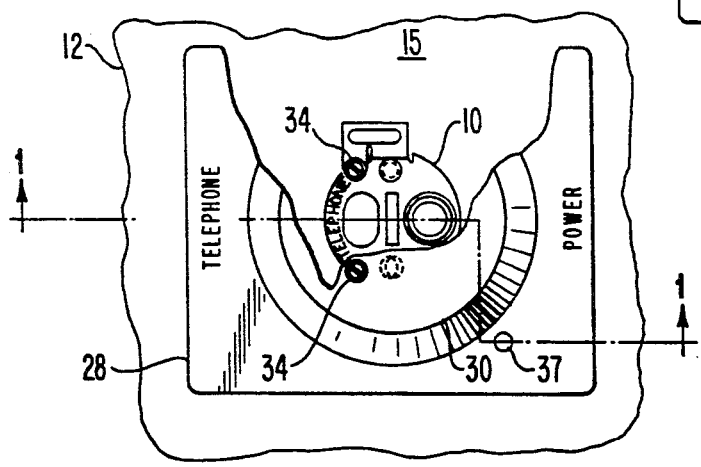
FIG. 2 is a top plan view of the apparatus of FIG. 1, partially cut away.
Figure 4:
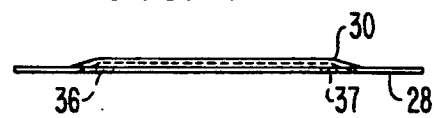
FIG. 4 is a side elevation of the top plate of FIG. 3 apart from the remainder of the fitting.

At the upper end of the fitting is an installation or top plate 28 which is also seen in FIGS. 2-4. Plate 28 has a generally flat peripheral portion and a raised central portion 30 which has two holes 32 for receiving threaded fasteners 34 by which the fitting 10 is fixedly and detachably connected to top plate 28 and, as will be described, to an electrical device frame. Normally, fitting 10 would have indicia such as the word "telephone" inscribed at the top and plate 28 is also provided with the printed or inscribed legend "telephone" so that the plate can be properly oriented with respect to the fitting at the time of installation. The word "power" can also be provided on the other side of the plate so that it is apparent which direction the passageways for the power and communication wires should be positioned.

Of particular significance to the present invention is the provision of holes 36 and 37 in the flat peripheral portion of plate 28. These holes lie outwardly of the central portion in that portion of the plate which is intended to abut and rest upon the upper surface 15 of floor 12 in which the fitting is to mounted.

In accordance with the present invention, a mounting for plate 28 or an electrical fitting frame or abandonment plate to the surface is arranged by forming holes through surface 15 and inserting a conventional expansion plug or anchor 40 into each hole after which fastener means such as a screw 42 can be inserted through holes 36 and 37 into each of the expansion plugs and tightened to securely fasten the top plate to the floor. The fitting, of course, is attached either to the top plate or the frame before this mounting process is completed. Typically, No. 10 screws 42 are used with either lead or plastic plugs. The fastener means can also be a floor rivet.

As will be recognized, the top plate is easily detachable from the remainder of the fitting which permits the top plate to be used as a template. If the floor is covered with a rug or other floor covering, the outline of the top plate can be felt under the covering, allowing the covering to be cut around the edge of the top plate and the portion of the floor covering lying under the plate is removed. Marks are made on the floor at the locations of holes 36 and 37. Holes of a suitable size to receive a floor rivet or conventional expansion plugs 40 are then drilled into the floor, the plugs are inserted, the plate is removed and a frame is attached to the remainder of the fitting. Screws 42 are then used to attach the frame to the floor, completing the installation process from a mechanical point of view.

A suitable frame for an electrical device is shown in FIGS. 5, 6 and 7, the frame indicated generally at 46 having a flat base plate 48 and upstanding side members 49 and 50. At each end of each side member is a sloping, inwardly turned end portion 52, each portion 52 having a hole 53 to receive a mounting screw. Holes 53 should be tapped to receive conventional mounting screws for mounting an electrical device such as a receptacle or the like so that a pair of in-turned portions 52 at one end of the frame can support a receptacle or other connection device between them.

Base plate 48 is provided with holes 54 which are located in the same relative relationship as holes 36 and 37 so that the frame can be mounted in the holes made by using plate 28 as a template. Plate 48 also has openings 56 and 57 positioned to allow the passage of power and communication wires, respectively, opening 57 also having portions 58 and 59 for screws 34 so that the fitting can be fixedly attached to the plate before mounting. Sidewalls 49 and 50 are provided with threaded holes 60 for attaching a cover.

A suitable cover 62 is shown in FIGS. 8 and 9, the cover comprising a downwardly opening U-shaped body having a top wall 64 and sidewalls 66, each of the sidewalls having an opening 68 through which a mounting screw can pass into threaded opening 60.

Figure 10:
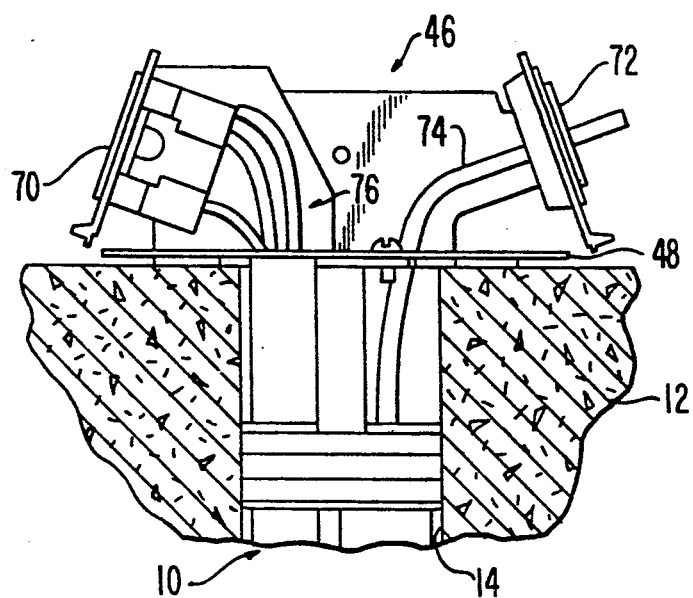
FIG. 10 is a side elevation, in partial section of a fitting and frame mounted in a floor.

FIG. 10 shows a side elevation, in partial section, of a frame 46 mounted in hole 14 in a floor 12 with fitting 10 attached to plate 48 of the frame. A conventional electrical receptacle 70 is mounted at one end of frame 46 and a conventional telephone plate bushing 72 is mounted at the other end. It is, of course, quite possible to mount power receptacles at both ends or communication connectors at both ends. In the arrangement illustrated in FIG. 10, a communication wire 74 extends through fitting 10 to the bushing and wires indicated generally at 76 extend through the power side of the fitting to receptacle 70. A junction box below the floor is used to connect the other ends of the power wires to available service lines in a conventional fashion.

Figure 11:
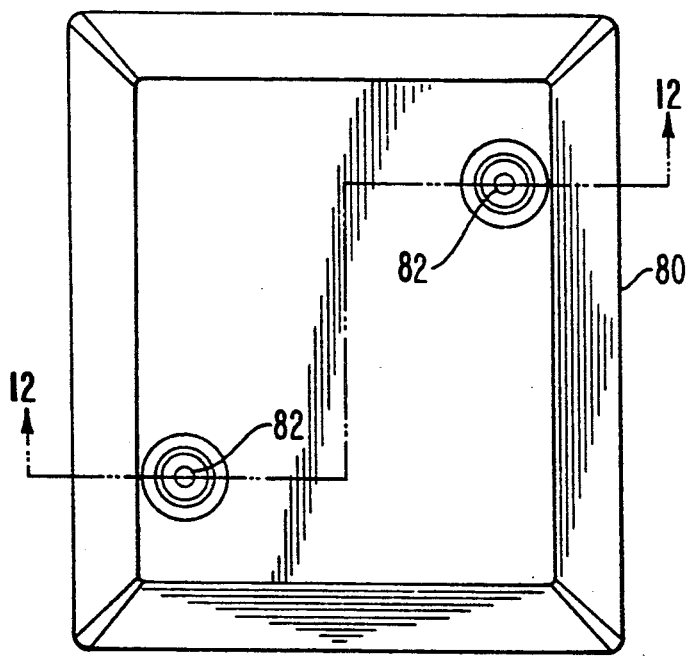
FIG. 11 is a top plan view of an abandonment plate.
Figure 12:
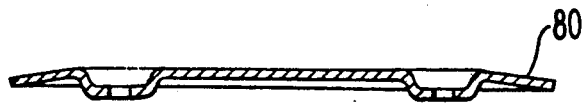
FIG. 12 is a sectional view along line 12—12 of FIG. 11.

FIGS. 11 and 12 show an abandonment plate 80 which can be used to close an opening which is not to be used for an undetermined interval of time. Plate 80 has recessed holes 82 which are located the same as holes 54 in frame 46 and the same as holes 36 and 37 in the mounting plate 28. When the use of a fitting such as shown in FIG. 10 is to be temporarily or permanently discontinued, the power to the poke-through fitting is disconnected in the junction box below the floor and any telephone or data service lines are also disconnected. The above-floor fitting is removed and plate 80 is attached in place of frame 46, using the same mounting screws.

As will be recognized, the fitting and associated apparatus disclosed herein can be used in either a concrete slab floor or a deck floor which employs corrugated metal with concrete. The installation plate disclosed herein allows a poke-through fitting to be installed in a partially completed building and allows vehicles to pass over the hole in the floor. It is further usable as a template for cutting carpet to the proper size as well as allowing the poke-through fitting to be oriented for power and telephone line connection. Further, the plate is usable as a template or drill jig for drilling two holes 36 and 37 in the concrete floor which is then used to fasten the above-floor service fitting frame 46 to the floor. The fitting is fastened to the frame using screws 34.

The result of attachment in this manner results in a much more secure assembly of the service fitting and poke-through. Should it be necessary to deactivate the service fitting, it is easily removed by removing screws 42 and replacing it with the abandonment plate. The abandonment plate, as will be seen in FIG. 11, is about 1 inch larger in each lateral dimension than the carpet cutout to give a finished appearance. If desired, the process can be reversed at some later time if it is desired to reinstall a service fitting over the poke-through fitting again.

Wiring of the fitting can be partly accomplished in advance of the installation, if desired.

While one advantageous embodiment has been chosen to illustrate the invention, it will be understood by those skilled in the art that various changes and modifications can be made therein without departing from the scope of the invention as defined in the appended claims.

What is claimed is:

1. A method of attaching a fire-rated fitting in an opening through a fire-rated floor, the fitting being of the type including a conduit element forming a passageway for wires to extend through the floor opening, fire barrier means operatively associated with the conduit element to block the wire passageway under fire and heat conditions and a top plate having a central portion fixedly attachable to an upper end of the conduit element and dimensioned to lie on the top surface of the floor, abutting the top surface around the floor opening, the method comprising
    forming a plurality of holes through the top plate at locations radially outside of the central portion,
    using the top plate as a template positionable in alignment with the floor opening to mark on the floor the locations of the plurality of holes in the top plate,
    forming holes in the floor in accordance with the holes through the top plate,
    attaching to the conduit element a wiring device frame having a central portion and a plurality of holes located therein in the same pattern and spacing as the holes in the top plate, and
    attaching the frame to the floor using fastener means passing through the plurality of holes in the frame and extending into the holes formed in the floor with the central portion of the frame aligned with the floor opening to thereby non-rotatably support the fitting in the floor opening.

2. A method of attaching a fire-rated fitting in an opening through a fire-rated floor, the fitting being of the type including a conduit element forming a passageway for wires to extend through the floor opening, fire barrier means operatively associated with the conduit element to block the wire passageway under fire and heat conditions and a top plate having a central portion fixedly attachable to an upper end of the conduit element and dimensioned to lie on the top surface of the floor, abutting the top surface around the floor opening, the method comprising
    forming a plurality of holes through the top plate at locations radially outside of the central portion,
    using the top plate as a template positionable in alignment with the floor opening to mark on the floor the locations of the plurality of holes in the top plate,
    forming holes in the floor in accordance with the holes through the top plate,
    attaching the top plate to the conduit element, and
    attaching the top plate to the floor using fastener means passing through the plurality of holes in the top plate and extending into the holes formed in the floor with the central portion of the plate aligned with the floor opening to thereby non-rotatably support the fitting in the floor opening.

* * * * *